United States Patent [19]
Tamura

[11] Patent Number: 5,331,560
[45] Date of Patent: Jul. 19, 1994

[54] APPARATUS AND METHOD FOR SELF DIAGNOSING ENGINE COMPONENT CONTROLLING SYSTEMS ACCORDING TO PREDETERMINED LEVELS OF PRIORITY

[75] Inventor: Hideyuki Tamura, Kanagawa, Japan

[73] Assignee: Nissan Motor Co., Ltd., Yokohama, Japan

[21] Appl. No.: 824,154

[22] Filed: Jan. 22, 1992

[30] Foreign Application Priority Data

Jan. 23, 1991 [JP] Japan .................. 3-006050

[51] Int. Cl.⁵ .............................. F02M 51/00
[52] U.S. Cl. .................. 364/431.12; 123/479;
123/690; 73/117.2; 364/186; 364/431.11
[58] Field of Search ............. 123/479, 480, 494, 570,
123/571, 688, 689, 690, 694; 364/431.11,
431.12, 186, 550, 551.01, 431.01, 431.05;
73/117.3, 118.1, 117.2

[56] References Cited

U.S. PATENT DOCUMENTS

| | | |
|---|---|---|
| 4,794,790 | 1/1989 | Margarit-Metaxa et al. ..... 73/118.1 X |
| 4,819,601 | 4/1989 | Harada et al. .................. 123/690 X |
| 4,870,941 | 10/1989 | Hisatomi ............................ 123/571 |
| 4,896,276 | 1/1990 | Saglimbeni et al. ................ 364/550 |
| 4,926,352 | 5/1990 | Staffe ................................... 364/550 |
| 5,162,999 | 11/1992 | Wild et al. ...................... 364/431.11 |

FOREIGN PATENT DOCUMENTS

| | | |
|---|---|---|
| 56-11067 | 3/1981 | Japan . |
| 62-51746 | 3/1987 | Japan . |
| 63-205441 | 8/1988 | Japan . |

Primary Examiner—Jack B. Harvey
Assistant Examiner—Edward Pipala
Attorney, Agent, or Firm—Foley & Lardner

[57] ABSTRACT

An apparatus and method for self diagnosing a plurality of engine component operation controlling systems applicable to an internal combustion engine in which when predetermined diagnostic conditions to start respective self diagnoses are simultaneously established for the respective engine component operation controlling systems, one of the self diagnoses having a higher priority is executed.

16 Claims, 5 Drawing Sheets

FIG. 6(a) EGR CUT ELE. VALVE ON/OFF
FIG. 6(b) INTAKE AIR PRESSURE
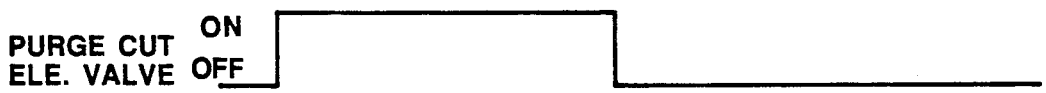
FIG. 7(a) PURGE CUT ELE. VALVE ON/OFF
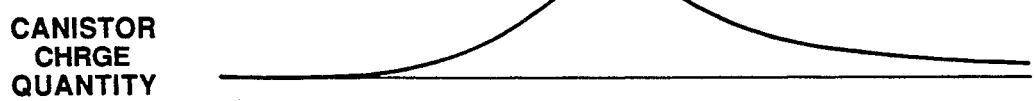
FIG. 7(b) CANISTOR CHRGE QUANTITY
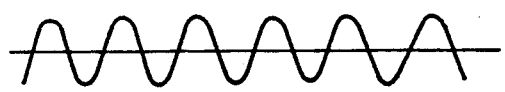
FIG. 8(a) UPSTREAM O2 SENSOR
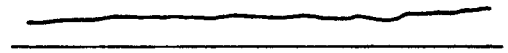
FIG. 8(b) DOWNSTREAM O2 SENSOR (NORMAL)
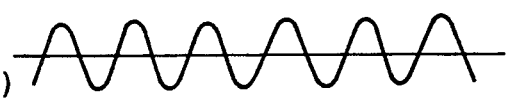
FIG. 8(c) DOWNSTREAM O2 SENSOR (DETERIORATED)

APPARATUS AND METHOD FOR SELF DIAGNOSING ENGINE COMPONENT CONTROLLING SYSTEMS ACCORDING TO PREDETERMINED LEVELS OF PRIORITY

BACKGROUND OF THE INVENTION (1) Field of the Invention

The present invention relates generally to an apparatus and method for self diagnosing an integrated microcomputer system having an architecture of a plurality of engine component operation controlling systems applicable to an internal combustion engine to determine a presence or absence of failure in any one or each of the controlling systems.

(2) Description of the Background Art

In the internal combustion engine of an automotive vehicle, a failure in an exhaust gas recirculation (EGR) system, deterioration in a catalytic converter, and/or failure in an evaporated fuel processing system using a canister are self diagnosed by their integrated control unit. When any one or some of the failures is detected, a previously proposed self-diagnosing apparatus uses an alarm unit on an instrument panel to warn of occurrence of the failure in the corresponding engine component controlling system using a memory in a remote control unit.

As another example, a Japanese Patent Application First Publication No. Showa 62-51746 published on Mar. 6, 1987 exemplifies another failure diagnosing apparatus for the exhaust gas recirculation system of the engine. In the disclosed failure diagnosing apparatus, an exhaust gas recirculation control valve of the EGR system is forcefully opened and closed when the engine falls in a predetermined operating region. A change in intake air pressure in an engine intake air passage is monitored to diagnose an operation of the exhaust recirculation system.

A Japanese Patent Application First Publication No. Showa 63-205441 published on Aug. 24, 1988 exemplifies another previously proposed self-diagnosing system in which air-fuel mixture ratio sensors or $O_2$ sensors are disposed in an exhaust passage of upstream or downstream sides of the catalytic converter. With both output signals derived and monitored from the $O_2$ sensors, the deterioration of the catalytic converter is diagnosed.

A Japanese Patent Application Second Publication No. Showa 58-11067 published on Mar. 12, 1981 exemplifies a previously proposed evaporated fuel processing having a canister which prevents flow out of the vaporized fuel generated in a fuel tank toward the external. The field of the evaporated fuel processing system demands such a self diagnosing system as described above, the self diagnosing system carries out the diagnosis such that a temperature change and air-fuel mixture ratio change are monitored after the start of discharge of, e.g., purge gas.

Although it is necessary to execute various types of self-diagnosis under particular engine operating conditions, various diagnostic conditions, in other words, engine loads and engine revolution speeds required to start respective diagnostic operations are often overlapped according to contents of the self-diagnosis, Hence, while any one of the self diagnosis is being executed, a diagnosis condition for the self-diagnose is simultaneously established.

In this case, If the self diagnosis currently being executed is continued without stop and with a high priority and the other self diagnosis whose diagnostic condition is thereafter established is not currently executed, the substantive self diagnosis for the exhaust gas recirculation system whose diagnostic condition is relatively difficult to be established could not be executed any more.

Conversely, If the self diagnostic currently being executed is suspended and the other self diagnosis whose diagnostic condition is thereafter established is started, an effective frequency of the self diagnostic operations is remarkably reduced since it is necessary to sufficiently adsorb an evaporated fuel component onto the canister in the case of the self diagnosis for the evaporated fuel processing system.

SUMMARY OF THE INVENTION

It is an object of the present invention to provide an apparatus and method for self diagnosing for several kinds of engine controlling systems applicable to an internal combustion engine which assure and execute diagnostic operations for the respective controlling systems on the basis of priorities taken for kinds of diagnosis.

The above-described object can be achieved by providing an apparatus for self diagnosing an integrated microcomputer system having an architecture of a plurality of engine component operation controlling systems applicable to an internal combustion engine, comprising: a) a plurality of self diagnosing blocks for executing the self-diagnosis for the respective engine component operation controlling systems, each self-diagnosis having a predetermined priority according to the kinds of self-diagnosis; b) a plurality of determining blocks for determining whether predetermined diagnostic conditions required for the respective self diagnosing blocks to start the self-diagnosis for the respective engine component operation controlling systems are established; c) a self-diagnose order setting blocks for setting the self-diagnose order of executing the respective self-diagnosis to a predetermined order according to kinds of the respective engine component operation controlling systems; d) a plurality of other self-diagnose execution monitoring blocks for monitoring whether one of the other self-diagnosis is being executed on the basis of a value of a flag while one of the self-diagnostic conditions corresponding to one of the engine component operation controlling systems is established, the value of the flag indicating which one of the self diagnosis is being executed; and, e) determining means for determining whether the execution of one of the self-diagnosis having the priority lower than that of one of the other self diagnosis is suspended when the one of the other self diagnosis having the priority higher than that of the one self diagnosis to be suspended is being executed according to the value of the flag.

The above-described object can also be achieved by providing an apparatus for integrally self diagnosing a plurality of controlling systems, comprising: a) a flag indicating which one of a plurality of self diagnosis routines for the respective controlling systems is currently being executed and initially reset to indicate a predetermined numerical value; b) first determining means for determining whether one of, the self diagnosis executing conditions assigned to the corresponding one of the self diagnosis is established; c) second determining means for determining whether the self diagnosis routine for the other controlling system is currently being executed on the basis of a value of the flag when the first determining means determines that the self diagnosis executing condition assigned to the corresponding self diagnosis is established; d) third determining means for determining whether the self diagnosis routine for the other controlling system currently being executed has a priority higher than that of the self diagnosis routine for the corresponding one of the controlling systems according to kinds of the self-diagnosis routines when the second determining means determines that the self diagnosis for the other controlling system is currently being executed; and, e) self diagnosis executing halting means for temporarily halting the execution of the self diagnosis routine whose diagnosis condition is currently established until completion of the self diagnosis routine currently being executed when the third determining means determines that the self diagnosis routine for the other controlling system has the priority higher than that of the self diagnose routine for the corresponding one of the controlling systems.

The above-described object can also be achieved by providing a method for self diagnosing an integrated microcomputer system having an architecture of a plurality of engine component operation controlling systems applicable to an internal combustion engine, comprising the steps of: a) setting a self-diagnosis order of executing a plurality of self-diagnosis for the respective engine component operation controlling systems to a predetermined order, each of the self-diagnosis having a predetermined priority according to kinds of the self diagnosis; b) determining whether predetermined diagnostic conditions required to start the respective self diagnosis assigned to the respective engine component operation controlling systems are established; c) monitoring whether one of the other self diagnosis is being executed on the basis of a value of a flag while one of the diagnostic conditions corresponding to one of the engine component operation controlling systems is established, the value of the flag indicating which one of the self diagnosis is being executed; d) determining whether the execution of one of the self diagnosis having the priority lower than that of one of the other self diagnosis is suspended when the one other self diagnose having the priority higher than that of the one self diagnose to be suspended is being executed according to the value of the flag; and e) executing each of the self diagnosis assigned to the corresponding engine component operation controlling system until the executions of all self diagnosis are ended.

BRIEF DESCRIPTION OF THE DRAWINGS

FIGS. 6 (a) and 6 (b) are operation timing charts of EGR cut electromagnetic valve and intake air pressure.

FIGS. 7 (a) and 7 (b) are operation timing charts of purge cut electromagnetic valve and canister charge quantity.

FIGS. 8(a), 8(b) and 8(c) are operation timing charts of upstream and downstream side $O_2$ sensors.

DETAILED DESCRIPTION OF THE PREFERRED EMBODIMENT

Reference will hereinafter be made to the drawings in order to facilitate a better understanding of the present invention.

Figure 1:
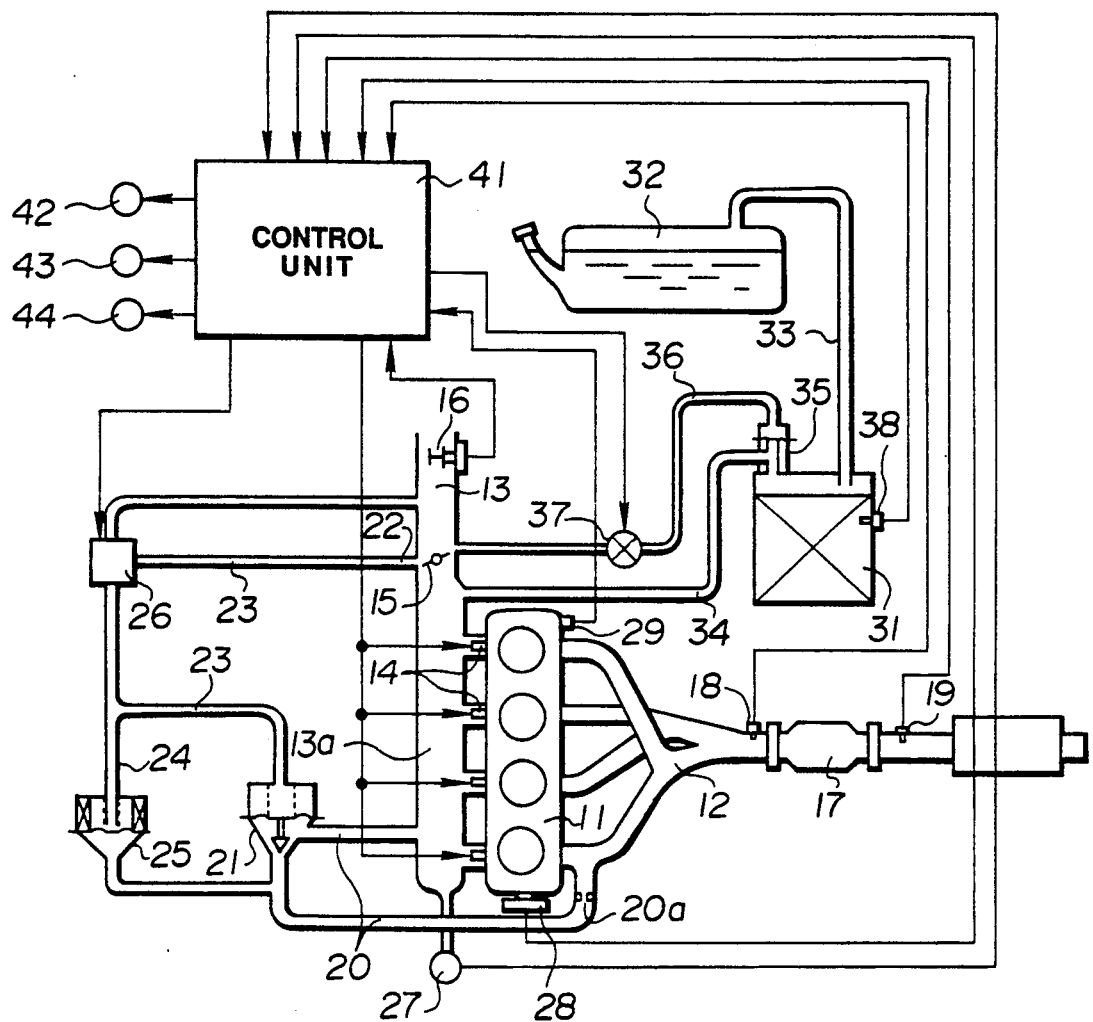
Fig. 1 is a circuit block diagram of a failure diagnosing apparatus in a preferred embodiment according to the present invention.

FIG. 1 shows a circuit block diagram of a self diagnosing apparatus applicable to an internal combustion engine in a preferred embodiment according to the present invention.

In the preferred embodiment shown in FIG. 1, three exhaust gas purifying systems, an exhaust gas recirculation system, evaporated fuel processing system, and catalytic converter are objects to be self diagnosed by the self-diagnosing system.

In FIG. 1, 11 denotes an engine main body, 12 denotes an exhaust gas passage, and 13 denotes an intake air passage. A plurality of fuel injection valves 14 are installed in branched portions downstream of the intake air passage 13 for the respective engine cylinders. Each fuel injection valve 14 supplies fuel toward each intake air port of the engine cylinders. A throttle valve 15 is disposed at an upstream portion of an intake air collector 13a. In addition, an air flowmeter of a hot wire type 16 is disposed at an upstream portion of the throttle valve 15 to measure an intake air quantity of the engine 11.

A catalytic converter 17 using three catalytic media is intervened in the exhaust gas passage 12. A first $O_2$ sensor 18 is disposed upstream of the catalytic converter 17 in the exhaust gas passage 12. A second $O_2$ sensor 19 is disposed downstream of the catalytic converter 17 in the exhaust gas passage 12. Both $O_2$ sensors 18, 19 produce electromotive force according to oxide concentrations left in the exhaust gas and have characteristics such that the electromotive forces are step-wise changed with a stoichiometric air-fuel mixture ratio as a center. It is noted that the second $O_2$ sensor 19 is used to learn and correct deteriorations of the characteristic of the first $O_2$ sensor 18 due to an aging effect. In addition, the first $O_2$ sensor 18 is used to self diagnose the deterioration of the catalytic converter 17 with the combination of the second $O_2$ sensor 19.

Referring to FIG. 1, an exhaust gas recirculation passage 20 is installed in a passage connecting between the exhaust gas passage 12 and intake air passage 13. An orifice 20a is provided in the exhaust gas recirculation passage 20. An exhaust gas recirculation control valve 21 having a diaphragm valve is installed in a downstream portion, i.e., toward the intake air passage 13 of the orifice 20a of the exhaust gas recirculation passage 20. A negative pressure chamber of the exhaust gas recirculation control valve 21 is communicated with a VC negative pressure take-out hole 22 open to a vicinity to a fully closed position of the throttle valve 15 via a negative pressure passage. In addition, one end of an atmospheric pressure introduction passage 24 is connected to the negative pressure passage 23. The other end of the atmospheric pressure introduction passage 24 is open or closed by means of the negative pressure control valve 25 of a back pressure transducer type (BPT) according to an exhaust gas pressure exerted at the upstream position of the exhaust gas recirculation control valve 21. That is to say, when a predetermined negative pressure is introduced into the exhaust gas recirculation control valve 21 via the negative pressure passage 23, the exhaust gas recirculation is carried out with the exhaust gas recirculation control valve 21 lifted. When the exhaust gas pressure located on the upstream position of the exhaust gas recirculation control valve 21 is reduced, the negative pressure control valve 25 opens to introduce the atmospheric pressure into the negative pressure passage 23 so that the exhaust gas recirculation control valve 21 is closed to halt the exhaust gas recirculation. However, since the exhaust gas pressure at the upstream position of the exhaust gas recirculation control valve 21 is raised due to the closure of the exhaust gas recirculation control valve 21, the air introduction through the negative pressure control valve 25 is suppressed and the exhaust gas recirculation control valve 21 is rather lifted. Such a series of operations as described above are repeated so that an exhaust gas recirculation ratio is properly controlled.

On the other hand, an EGR cut solenoid valve 26 is disposed in the negative pressure passage 23 in order to forcefully halt the exhaust gas recirculation, the EGR cut solenoid valve 26 being constituted by three-way electromagnetic valve. When the EGR cut solenoid valve 26 is in an OFF state, the negative pressure passage 23 is held in the communication state. When the EGR cut solenoid valve 26 is in an ON state, the negative pressure passage 23 is interrupted, the atmospheric pressure is introduced to the exhaust gas recirculation control valve 21. The EGR cut solenoid valve 26 is used to halt the exhaust gas recirculation at times of engine cold condition or engine idling and when an abnormality is diagnosed for the exhaust gas recirculation system as will be described later.

An intake air pressure sensor 27 is attached onto an intake air collector 13a into which the exhaust gas is recirculated, i.e., placed at a downstream position of the throttle valve 15 of the intake air passage 13 in order to detect an absolute pressure or gage pressure of the intake air.

It is noted that a crank angle sensor 28 is installed to detect an engine revolution speed and a coolant temperature sensor 29 is installed to detect an engine coolant temperature.

A canister 31 is installed in which an absorption agent constituted by an activated charcoal is used. The canister 31 constitutes the vaporized fuel processing system. The canister 31 is always communicated with an upper space of a fuel tank 32 via a vaporized fuel passage 33. In addition, a purge gas exit of the canister 31 is communicated with a downstream position of the throttle valve 15 of the intake air passage 13 via a purge passage 34. The purge gas exit of the canister 31 is provided with a diaphragm type purge control valve 35. The purge control valve 35 is opened and closed according to a negative pressure introduced via the negative pressure passage 36. A tip end of the negative passage 36 opens slightly at the upstream side with respect to the full close position of the throttle valve 15. Under a low load state such as an engine idling, the purge control valve 35 is closed so that the introduction of the purge gas is halted with the purge control valve 35 closed, Furthermore, a purge cut solenoid valve 37 is intervened in the negative pressure passage 36. When the purge cut solenoid valve 37 is closed, the introduction of the purge gas is similarly halted when the purge cut solenoid valve 37 is closed.

A temperature sensor 38 is attached on the canister 81 to detect a temperature change along with a charge of the fuel component or purge thereof.

A control unit 41 receives detection signals derived from various types of sensors. The control unit 41 is constituted by a microcomputer and carries out a fuel injection quantity control for the fuel injection valves 14 through an air-fuel mixture ratio control method using the air-fuel mixture ratio ($O_2$) sensors 18 and 19, ON and OFF controls of the EGR cut solenoid valve 26 on the basis of the engine operating conditions derived from the coolant temperature and engine load, and ON and OFF controls using the purge cut solenoid valve 37. In addition, the control unit 41 performs the self-diagnostic operations for the exhaust gas recirculation system, catalytic converter 17, and the vaporized fuel processing system. If the control unit 41 determines that the failure is present in any one of the above-described systems under the self-diagnostic operations, the control unit 41 illuminates one of corresponding alarm lamps 42, 48, and 44 and stores the contents of abnormalities into its memory unit.

Next, an operation of the preferred embodiment described above will be explained below.

Figure 2:
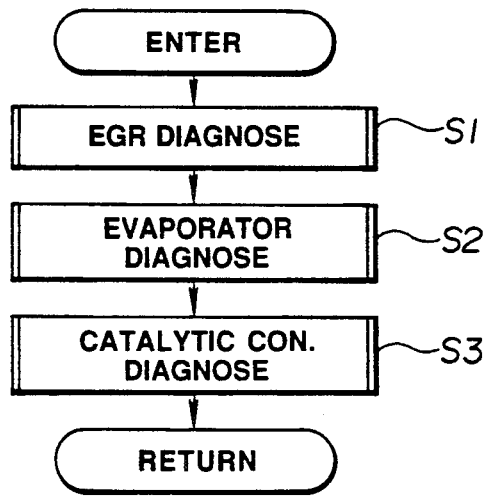
Fig. 2 is a generally operational flowchart of the failure diagnosing apparatus in the preferred embodiment shown in FIG. 1.

FIG. 2 shows a main routine of the self-diagnosis operation executed by the control unit 41.

As shown in FIG. 2, a first step S1 in which a failure diagnose processing for the exhaust gas recirculation system (EGR diagnose) is executed. In a step S2, the self diagnose processing for the evaporated fuel processing system is thereafter executed (evaporation diagnose) is executed. In a step S3, a deterioration diagnose processing for the catalytic converter 17 is finally executed.

It is noted that the exhaust gas recirculation abnormal processing (step S1) is first executed with the highest priority. If diagnosed conditions to be described later are simultaneously established, the abnormal diagnosis for the exhaust gas recirculation are substantially preceded. This is because an engine operating region under which the exhaust gas recirculation system is subjected to the diagnosis is relatively narrow and a frequency at which the diagnostic conditions are established is relatively low.

Figure 3:
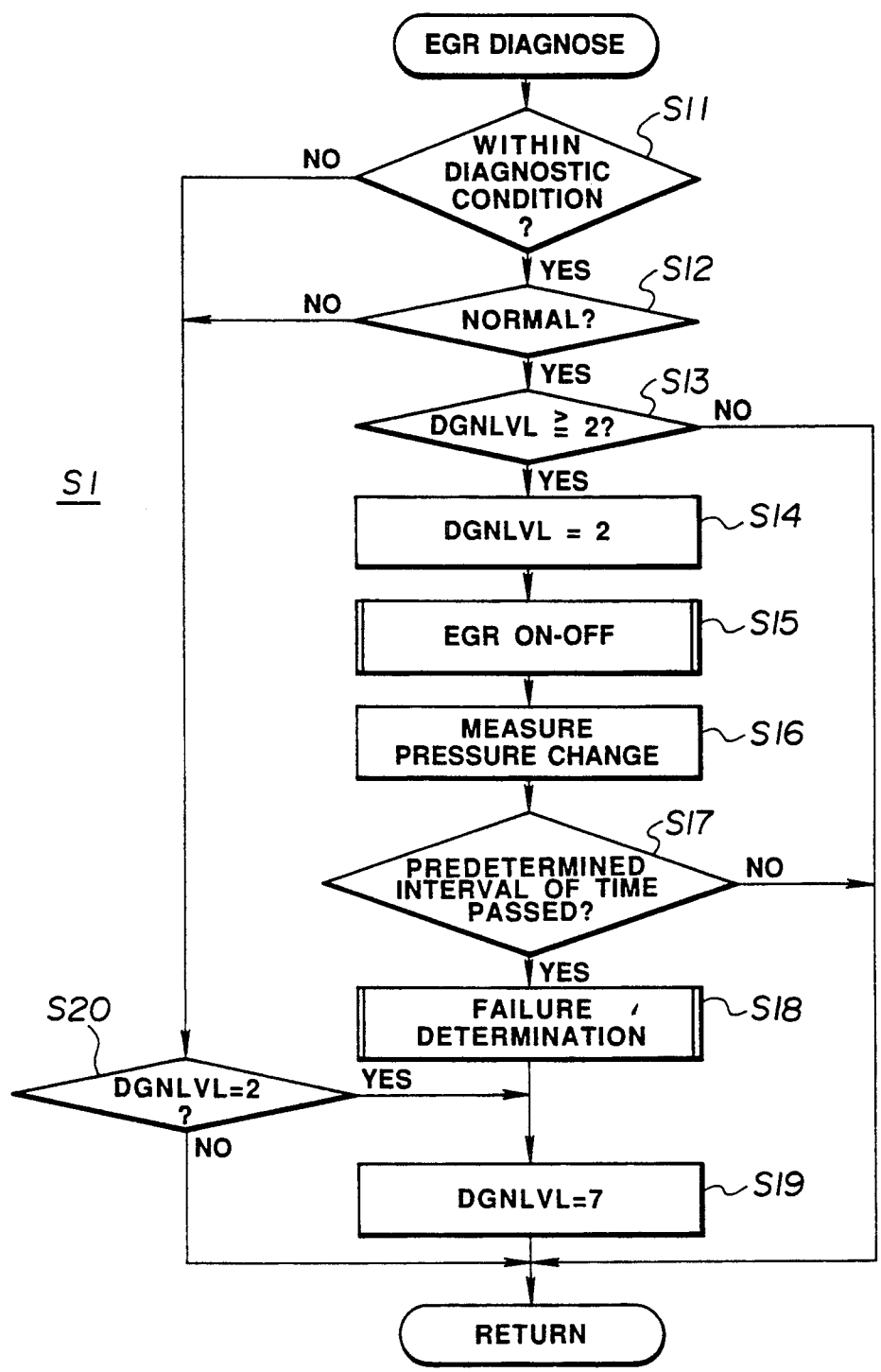
FIG. 3 a detailed operational flowchart of a step S1 shown in FIG. 2.

FIG. 3 shows a detailed operational routine executed in the step S1 of FIG. 2.

In a step S11, the control unit 41 determines whether predetermined diagnostic conditions for the EGR system are established. In detail, the control unit 41 determines whether an engine revolution speed N, an engine load (for example, a basic fuel injection quantity Tp), an engine coolant temperature TW, and an opening angle of the throttle valve TVO fall within predetermined ranges, respectively. If the respective conditions are satisfied, the routine goes to a step S12 in which the control unit 41 determines whether the engine falls within a steady state (in FIG. 2, a term of NORMAL ? is used) according to a change rate of the engine revolution speed N and a change rate of the opening angle TVO of the throttle valve 15. When the conditions described in the steps S11, S12 are not satisfied, no substantive diagnosis is carried out.

If YES in the step S12, the routine goes to a step S13. In the step S13, the control unit 41 determines whether a value of DGNLVL is above 2. A parameter (hereafter, also called a flag) DGNLVL denotes a parameter to determine priority taken for the self diagnosis (and to determine which one of the self diagnosis is being currently executed) and indicates an initial value of 7 when neither of the self diagnosis is started.

Hence, the initial value with neither of the diagnosis started is 7. In addition, when neither of the other diagnosis is executed, the routine goes to a step S14 in which the parameter DGNLVL is set to "2".

In steps S15 through S18, the control unit 41 executes the substantive abnormality diagnosis. That is to say, in the step S15, the EGR cut solenoid valve 26 is forcefully turned on or off, and, in the step S16, the control unit 41 calculates a pressure change ΔP of the intake air pressure as the result of the forceful ON and OFF of the EGR cut solenoid valve 26. Specifically, as shown in FIGS. 6 (a) and 6(b), the intake air pressure Pa immediately before the exhaust gas recirculation is halted is detected on the basis of the output result of the intake air pressure sensor 27. Thereafter, the intake air pressure Pb is detected after a constant interval of time has passed with a response delay of the pressure change upon turn on of the EGR cut solenoid valve 26 taken into account. Then, a difference between both pressure changes is set to ΔP1. In addition, with the EGR cut solenoid valve 26 turned off upon detection of the intake air pressure Pb, the intake air pressure Pc is detected after the constant period of time, the response delay in the pressure change taken into account, has passed. In addition, suppose that the difference between the intake air pressures Pb and Pc is ΔP2 and an average value (ΔP1+ΔP2)/2 between ΔP1 and ΔP2 is derived as the pressure difference ΔP. If the exhaust gas recirculation system operates normally, the pressure difference ΔP is derived as a large value exceeding a predetermined value.

The measurements (calculations) of the pressure change described above are executed number of times in order to avoid an erroneous determination.

When after a predetermined number of times the above-described calculations of the pressure change are repeated, the routine goes to the step S18 via the step S17. In the step S18, the failure determination whether the exhaust gas recirculation system is abnormal is carried out.

It is noted that during the self diagnose execution the parameter DGNLVL is held to indicate "2".

Upon completion of the series of diagnostic executions for the exhaust gas recirculation system, the parameter DGNLVL is returned to the initial value of "7" in the step S19.

On the other hand, in a case where the engine operating condition falls outside of the predetermined conditions recited in the steps S1 and S2, the diagnostic operations are suspended and the parameter DGNLVL is returned to "7" in the steps 20 and 19.

Figure 4:
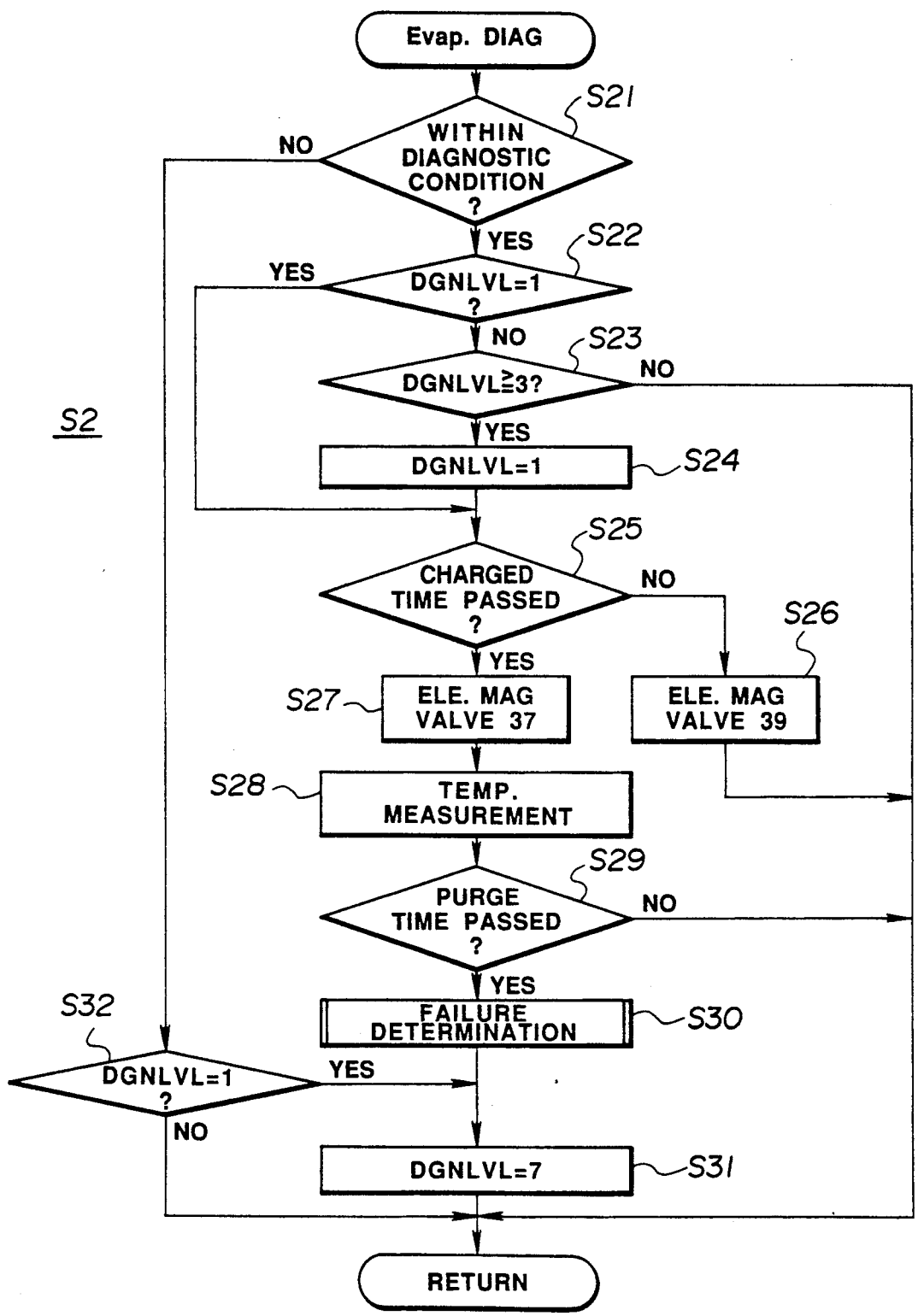
FIG. 4 is a detailed operational flowchart of a step S2 shown in FIG. 3.

Next, FIG. 4 shows a detail flowchart of the step S2 shown in FIG. 2 for the diagnosis of the evaporated fuel processing system.

In a step S21, the determination for the diagnostic operation is carried out in the same way as in the step S11.

If the respective diagnostic operations are satisfied, the control unit 41, in the steps S22 and S23, determines the indicated value of the parameter of DGNLVL. In the step S22, the control unit 41 determines whether DGNLVL indicates 1. If DGNLVL indicates 1, the control unit 41 continues its diagnosis in steps 22 through 25 since the control unit 41 determines that 1 of DGNLVL means that the substantive diagnose of the vaporized fuel processing system is being executed. In the step S23, the control unit 41 determines whether the value of DGNLVL exceeds 3. Since the initial value of DGNLVL when the other diagnosis are not executed is 7 as described above, the routine goes from the step S23 to the step S24 in which the parameter of DGNLVL is set to "1" and the substantive diagnosis thereafter executed.

If the substantive diagnosis for the exhaust gas recirculation system is preceded, the diagnosis for the vaporized fuel processing system is not executed. In other words, the diagnosis for the exhaust gas recirculation is continued.

The substantive diagnosis for the vaporized fuel processing system is executed in steps S25 through S30. While the diagnosis is started and a predetermined charge time is passed, a purge of fuel component is halted with the purge cut solenoid valve 37 turned off (closed) in steps S25, S26. Then, the fuel component is stored in the canister 31 (refer to FIGS. 7 (a) and 7 (b)).

Upon passage of the predetermined purge time, the purge cut solenoid valve 37 is turned off (open) so that the purge of the fuel component is started in a step S27. A detection temperature of a temperature sensor 38 is sequentially read until the predetermined monitoring time has passed in steps S28 and S29. The temperature change is used to determine a presence or absence of failure in the vaporized fuel processing system in a step S30.

That is to say, if the vaporized fuel processing system operates normally, the fuel component sufficiently stored in the canister 81 is speedily purged as shown in FIGS. 7 (a) and 7 (b). Consequently, the temperature in the canister 81 is reduced. Hence, if the temperature reduction is not detected, the control unit 41 can determine that an abnormal state occurs in the Vaporized fuel processing system. During the diagnose execution described above, the parameter DGNLVL is maintained at "1".

Upon completion of the series of diagnosis for the vaporized fuel processing system, the parameter DGNLVL is returned to 7 of the initial value in a step S31.

On the other hand, in a case where the diagnostic conditions are out of the predetermined diagnostic conditions in the step S31 at a point midway through the diagnostic operation, the control unit 41 returns the value of DGNLVL to 7 of the initial value in the step S31.

In addition, if the diagnostic conditions are out of predetermined diagnostic conditions of the step S31 in the at a point midway through the diagnostic operation, the diagnostic operation is suspended and the parameter DGNLVL is returned to 7 in steps S32 and S31.

Figure 5:
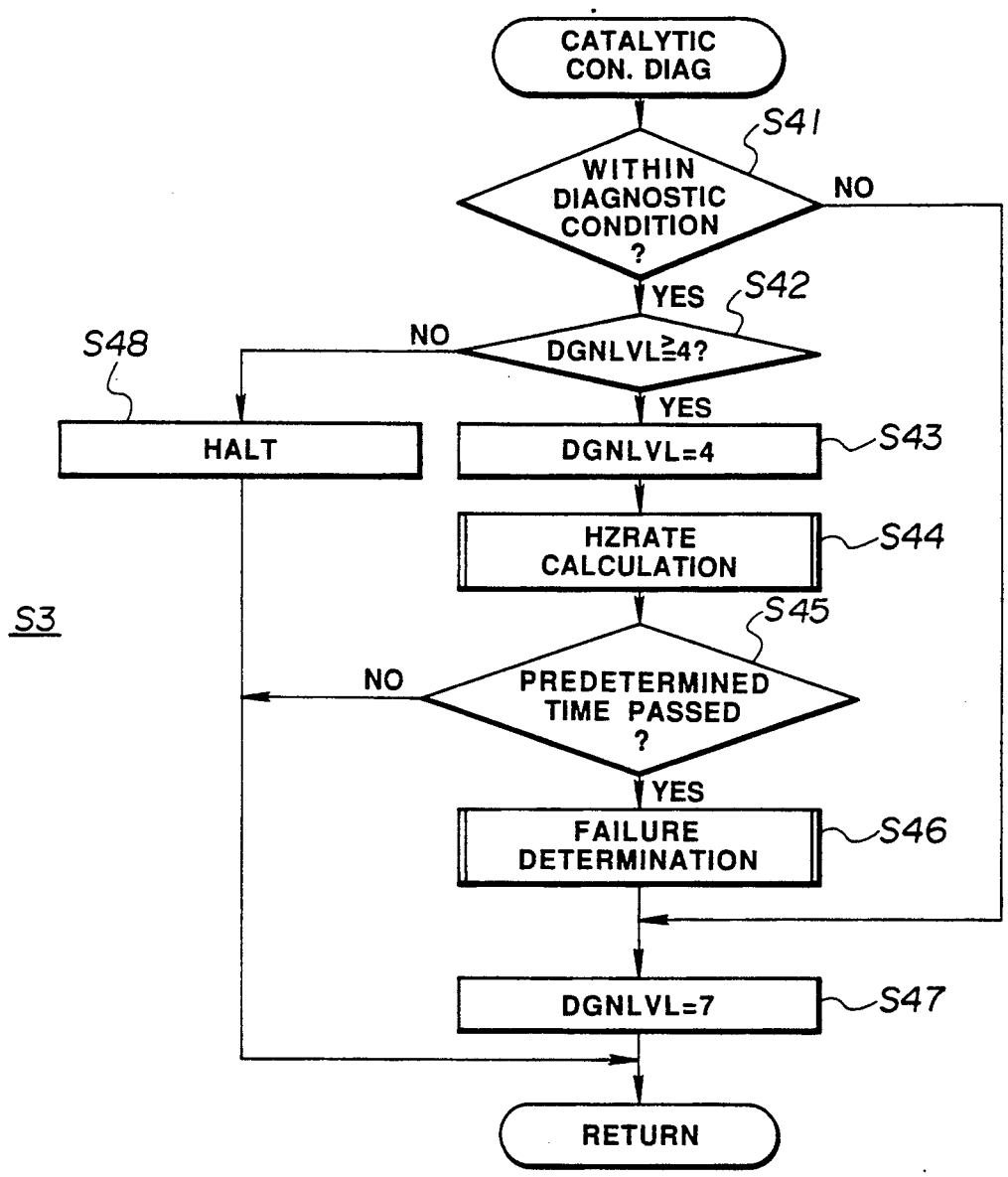
FIG. 5 is a detailed operational flowchart of a step S3 shown in FIG. 4.

FIG. 5 shows a detailed operational flow of the step S3, i.e., the abnormal diagnose processing carried out for the catalytic converter 17, in FIG. 2.

In a step S41, the control unit 41 determines whether conditions to execute the diagnosis are satisfied as in the steps S21 or S11. That is to say, the control unit 41 determines whether the engine revolution speed N, basic fuel injection quantity Tp, and opening angle TVO of the throttle valve fall within the predetermined ranges, respectively, specifically, the engine falls in the steady state, i.e., in the air-fuel mixture ratio feedback control region. If the above-described diagnostic condition is satisfied, the routine goes to a step S42 in which the control unit 41 determines whether the parameter DGNLVL exceeds 4.

It is noted that since the value of DGNLVL is set to 2 or to 1 in cases where the substantive diagnose for the exhaust gas recirculation or the substantive diagnosis for the vaporized fuel processing system is proceeding, the substantive diagnosis for the catalytic converter 17 is not executed. In other words, the diagnose by the control unit 41 previously in the execution has a priority.

In a case where the value of DGNLVL is 7 of the initial value, the routine goes from a step S42 to a step S43 in which the value of DGNLVL is set to 4 and the substantive diagnosis is thereafter executed.

The substantive diagnose is executed in steps S44 through S46. The actual air-fuel mixture ratio repeats the variation in rich side and lean side at a suitable period. An output signal of the upstream side first $O_2$ sensor 18 indicates such a waveform as repeating the rich side and lean side as shown in FIG. 8 (a). On the other hand, the output signal of the downstream side second $O_2$ sensor 19 indicates the smaller variation width as shown in FIG. 8 (b) due to a storage capacity of $O_2$ of the catalytic converter 17 when the catalytic converter 17 operates normally, as shown in FIG. 8 (b) and indicates longer period. However, when the catalyst in the catalytic converter 17 becomes deteriorated, the oxygen concentrations of the exhaust gas at positions placed between the upstream side and downstream side of the catalytic converter 17 seldom changes due to reduction of the capacity of storing $O_2$. Consequently, the output signal of the downstream side second $O_2$ sensor repeats inversions of the level at a period approximate to the output signal of the upstream side $O_2$ sensor 18, as shown in FIG. 8 (c).

Then, in a step S44, a ratio of both of a frequency f1 at which the upstream side first $O_2$ sensor 18 outputs the repeated rich side and lean side signal for a predetermined measurement period (step S45) and of a frequency f2 at which the downstream side second $O_2$ sensor 19 outputs the repeated rich side and lean side signal, i.e., HZRATE=f1/f2 is derived.

In a step S46, the control unit 41 determines whether the ratio HZRATE indicates an abnormal value as compared with a predetermined reference value.

Upon completion of the series of diagnosis for the catalytic converter 17, the parameter DGNLVL described above is returned to 7 of the initial value in a step S47.

In addition, in a case where the diagnostic conditions are out of the predetermined conditions recited in the step S41, the diagnosis is suspended and the parameter DGNLVL is returned to 7 of the initial value in a step S47.

On the other hand, if the diagnostic conditions are out of predetermined conditions of the step S41, the diagnose conditions are suspended and the parameter DGNLVL is returned to 7 in the step S47.

It is noted that during the execution of the diagnosis for the catalytic converter 17, the parameter DGNLVL is set to 4 as described before. Hence, if the diagnostic condition for performing either of the other diagnosis (in other words, the exhaust gas recirculation system or vaporized fuel processing system) is established, the start of the diagnosis that the diagnostic condition has established cannot thereafter be prevented. The diagnose for either the exhaust gas recirculation system or the vaporized fuel processing system has a high priority. In this case, since the parameter DGNLVL is set to either 2 or 1, the diagnosis for the catalytic converter 17 is forcefully suspended in steps S42 and S48.

In summary, in a case where either of the two diagnostic conditions is established although the execution for the diagnosis for the catalytic converter 17 is being carried out, the other two diagnosis are started with the priority. On the other hand, during the execution of the diagnosis for either the exhaust gas recirculation system or the vaporized fuel processing system, the diagnose for either of the other systems is not interrupted. The diagnose currently being executed remains continued.

Hence, the diagnosis for the exhaust gas recirculation system having less frequency of establishment of the conditions is assuredly executed.

In addition, once the diagnosis for the vaporized fuel processing system is started, the fuel component charged in the canister 31 is not wastefully discharged and the completion of diagnosis can be assured.

Although, in the preferred embodiment, self diagnosis for three processing systems are carried out, the present invention is applicable to self diagnosis for the multiple number of systems in an internal combustion engine.

As described hereinabove, in the self-diagnose system for the internal combustion engine according to the present invention, the determination of the diagnostic conditions is executed when a number of systems are self diagnosed in a predetermined order according to the kinds of self diagnosis and the diagnose processing is carried out according to the priority order when the other diagnosis conditions are established. The diagnose having the frequency at which the diagnostic conditions are established can thus be assured. It is possible to continue the diagnosis which are preferably not suspended until the completion of the corresponding diagnosis.

It will fully be appreciated by those skilled in the art that the foregoing description has been made to the preferred embodiment and various changes and modifications may be made without departing from the scope of the present invention which is to be defined by the appended claims.

What is claimed is:

1. An apparatus for self diagnosing a plurality of engine component operation controlling systems applicable to an internal combustion engine, comprising:
   a) a plurality of self diagnosing blocks for executing self-diagnosis of the respective engine component operation controlling systems, each self-diagnosis having a predetermined priority according to the kind of self-diagnosis;
   b) a plurality of determining blocks for determining whether predetermined diagnostic conditions required for the respective self diagnosing blocks to start the self-diagnosis for the respective engine component operation controlling systems are established;
   c) a self-diagnosis order setting block for setting a self-diagnosis order of executing the respective self-diagnosis to a predetermined order according to the kind of each of the engine component operation controlling systems;
   d) a plurality of self-diagnosis execution monitoring blocks for monitoring whether one of the other self-diagnosis is being executed on the basis of a value of a flag while one of the self-diagnostic conditions corresponding to one of the engine component operation controlling systems is established, the value of the flag indicating which one of the self diagnosis is being executed; and, e) determining means for determining whether the execution of a first self-diagnosis having a priority lower than that of a second self-diagnosis is suspended when the second self-diagnosis is being executed according to the value of the flag.

2. An apparatus for self diagnosing a plurality of engine component operation controlling systems applicable to an internal combustion engine as set forth in claim 1, wherein the plurality of the engine component operation controlling systems are an exhaust gas recirculation system, a vaporized fuel processing system, and a catalytic converter.

3. An apparatus for self diagnosing a plurality of engine component operation controlling systems applicable to an internal combustion engine as set forth in claim 2, wherein the self diagnosis for the exhaust gas recirculation system has a highest priority and the determining block for the exhaust gas recirculation system is the first carried out.

4. An apparatus for self diagnosing a plurality of engine component operation controlling systems applicable to an internal combustion engine as set forth in claim 3, wherein the flag indicates 7 when any one of the self-diagnosis is not being carried out and when any of the self-diagnosis ended.

5. An apparatus for self diagnosing a plurality of engine component operation controlling systems applicable to an internal combustion engine as set forth in claim 4, wherein the predetermined order is such that the self-diagnosis for the exhaust gas recirculation system is first, the self-diagnosis for the vaporized fuel processing system is second, and the self-diagnosis for the catalytic converter is third.

6. An apparatus for self diagnosing a plurality of engine component operation controlling systems applicable to an internal combustion engine as set forth in claim 5, wherein the flag is set to indicate 2 when the diagnostic condition for the execution of the self diagnosis for the exhaust gas recirculation system is established, the engine falls within a steady state, and a corresponding monitoring block monitors that the current value of the flag indicates 2 or more.

7. An apparatus for self diagnosing a plurality of engine component operation controlling systems applicable to an internal combustion engine as set forth in claim 6, wherein the flag is set to indicate 1 when the diagnostic condition for the execution of the self diagnosis for the vaporized fuel processing system is established and the value of the flag is currently indicating 3 or more.

8. An apparatus for self diagnosing a plurality of engine component operation controlling systems applicable to an internal combustion engine as set forth in .claim 7, wherein the flag is set to indicate 4 when the diagnostic condition for the execution of the self diagnosis for the catalytic converter is established and the value of the flag is currently indicating 4 or more.

9. An apparatus for self diagnosing a plurality of engine component operation controlling systems applicable to an internal combustion engine as set forth in claim 8, wherein the execution of the self diagnosis for the catalytic converter is suspended when the diagnostic condition corresponding to the self diagnosis for the catalytic converter is established and the value of the flag is currently indicating less than 4.

10. An apparatus for self diagnosing a plurality of engine component operation controlling systems applicable to an internal combustion engine as set forth in claim 9, wherein the self diagnosis for the exhaust gas recirculation system is executed as follows:

a) operating an EGR cut solenoid valve of the exhaust gas recirculation system to forcefully turn on and off the EGR cut solenoid valve:

b) measuring a change in pressure $\Delta P$ caused by the turn on and off of the EGR solenoid valve;

c) detecting whether the change in pressure $\Delta P$ exceeds a predetermined value;

d) repeating the steps a) through c) by a predetermined number of times; and e) determining that a failure in the exhaust gas recirculation system occurs according to a result of execution of the step d).

11. An apparatus for self diagnosing a plurality of engine component operation controlling systems applicable to an internal combustion engine as set forth in claim 10, wherein the self diagnosis for the vaporized fuel processing system is executed as follows:

f) determining whether a predetermined charge time has passed upon the start of the self diagnosis so that a fuel component is fully stored in a canister of the vaporized fuel processing system;

g) turning off a purge cut solenoid valve to start the purge of fuel component upon the passage of the predetermined purge time;

h) reading a detected value of a temperature sensor for sensing a temperature change of the charged fuel component in the canister until a predetermined monitor time has passed; and i) determining that a failure in the vaporized fuel processing system occurs according to the result of the temperature change read in the step h).

12. An apparatus for self diagnosing a plurality of engine component operation controlling systems applicable to an internal combustion engine as set forth in claim 11, wherein the self diagnosis for the catalytic converter installed in an exhaust passage of the engine is executed as follows:

J) detecting a frequency f1 at which an output signal of a first $O_2$ sensor located at an upstream side of the catalytic converter indicates a rich side and lean side and detecting a frequency f2 at which an output signal of a second $O_2$ sensor located at a downstream side of the catalytic converter indicates a rich side and lean side;

k) calculating a ratio KZRATE of both of the frequencies f1 and f2 (HZRATE=f1/f2);and i) determining whether a deterioration of the catalytic converter occurs according to a comparison result between the ratio and a reference value.

13. An apparatus for self diagnosing a plurality of engine component operation controlling systems applicable to an internal combustion engine as set forth in claim 12, wherein the predetermined diagnostic conditions are the same for all engine component operation controlling systems.

14. An apparatus for self diagnosing a plurality of engine component operation controlling systems applicable to an internal combustion engine as set forth in claim 13, wherein each of the predetermined diagnostic conditions is such that and engine revolution speed N, and an opening angle TVO of an engine throttle valve are within a predetermined range, respectively.

15. An apparatus for integrally self diagnosing a plurality of controlling systems, comprising:
   a) a flag indicating which one of a plurality of self diagnosis routines for the respective controlling systems is currently being executed, said flag being initially reset to indicate a predetermined numerical value;
   b) first determining means for determining whether a self diagnosis executing condition assigned to a corresponding one of the self diagnosis is established;
   c) second determining means for determining whether the self diagnosis routine for another controlling system is currently being executed on the basis of a value of the flag when the first determining means determines that the self diagnosis executing condition assigned to the corresponding self diagnosis is established;
   d) third determining means for determining whether the self diagnosis routine for another controlling system currently being executed has a priority higher than that of the self diagnosis routine for the corresponding one of the controlling systems according to kinds of self-diagnosis routines when the second determining means determines that the self diagnosis for another controlling system is currently being executed; and
   e) self diagnosis executing halting means for temporarily halting the execution of the self diagnosis routine whose diagnosis condition is currently established until completion of the self diagnosis routine currently being executed when the third determining means determines that the self diagnosis routine for another controlling system has a priority higher than that of the self diagnosis routine for the corresponding one of the controlling systems.

16. A method for self diagnosing a plurality of engine component operation controlling systems applicable to an internal combustion engine, comprising the steps of:
   a) setting a self-diagnosis order of executing a plurality of self-diagnosis for the respective engine component operation controlling systems to a predetermined order, each of the self-diagnosis having a predetermined priority according to kinds of the self diagnosis;
   b ) determining whether predetermined diagnostic conditions required to start the respective self diagnosis assigned to the respective engine component operation controlling systems are established;
   c) monitoring whether one of the other self diagnosis is being executed on the basis of a value of a flag while one of the diagnostic conditions corresponding to one of the engine component operation controlling systems is established, the value of the flag indicating which one of the self diagnosis is being executed;
   d) determining whether the execution of one of the self diagnosis having a priority lower than that of one of the other self diagnosis is suspended when one other self diagnose having the priority higher than that of the one self diagnosis to be suspended is being executed according to the value of the flag; and
   e) executing each of a self diagnosis assigned to the corresponding engine component operation controlling system until the executions of all self diagnosis are ended.

* * * * *